United States Patent [19]
Isabelle et al.

[11] Patent Number: 5,113,713
[45] Date of Patent: May 19, 1992

[54] ELASTOMERIC LOAD SHARING DEVICE

[75] Inventors: Charles J. Isabelle, Winsted; Jules G. Kish, Milford; Robert A. Stone, Sandy Hook, all of Conn.

[73] Assignee: United Technologies Corporation, Hartford, Conn.

[21] Appl. No.: 653,587

[22] Filed: Feb. 11, 1991

[51] Int. Cl.⁵ .............................................. F16H 55/18
[52] U.S. Cl. ....................................... 74/410; 74/411; 74/440
[58] Field of Search ................... 74/409, 410, 411, 440

[56] References Cited

U.S. PATENT DOCUMENTS

| | | | |
|---|---|---|---|
| 2,466,218 | 4/1949 | Farrell et al. | 74/411 X |
| 3,195,324 | 7/1965 | Sellwood et al. | 74/411 X |
| 3,381,548 | 5/1968 | Wolkenstein | 74/411 X |
| 3,513,715 | 5/1970 | Whitfield | 74/410 |
| 4,328,879 | 5/1982 | Tone | 74/411 X |
| 4,503,719 | 3/1985 | Hamano | 74/411 X |
| 4,674,351 | 6/1987 | Byrd | 74/411 X |
| 4,770,054 | 9/1988 | Ha | 74/409 |
| 4,912,998 | 4/1990 | Sugano et al. | 74/409 |

Primary Examiner—Dirk Wright
Attorney, Agent, or Firm—Terrance J. Radke

[57] ABSTRACT

An elastomeric load sharing device, interposed in combination between a driven gear and a central drive shaft to facilitate balanced torque distribution in split power transmission systems, includes a cylindrical elastomeric bearing and a plurality of elastomeric bearing pads. The elastomeric bearing and bearing pads comprise one or more layers, each layer including an elastomer having a metal backing strip secured thereto. The elastomeric bearing is configured to have a high radial stiffness and a low torsional stiffness and is operative to radially center the driven gear and to minimize torque transfer through the elastomeric bearing. The bearing pads are configured to have a low radial and torsional stiffness and a high axial stiffness and are operative to compressively transmit torque from the driven gear to the drive shaft. The elastomeric load sharing device has spring rates that compensate for mechanical deviations in the gear train assembly to provide balanced torque distribution between complementary load paths of split power transmission systems.

8 Claims, 3 Drawing Sheets

ELASTOMERIC LOAD SHARING DEVICE

The invention described herein was made in the performance of work under NASA Contract and is subject to the provisions of Section 305 of the National Aeronautics and Space Act of 1958 (72 Stat. 435; 42 U.S.C. 2457).

RELATED APPLICATION

This application is related to commonly-owned U.S. patent application Ser. No. 525,388, entitled "Elastomeric Torsional Isolator", filed May 16, 1990.

TECHNICAL FIELD

This invention relates to transmission systems, and more particularly to an elastomeric load sharing device for providing balanced torque loads between torque splitting gear assemblies in split power transmission systems, especially split power transmission systems for helicopters.

BACKGROUND ART

In some transmission systems, and in particular helicopter transmission systems, there is a need to split the power (torque) developed by the engine system so that two or more load paths are provided for transfer of power to an output member. Such split power configurations reduce the tooth loading of the gear train assemblies comprising the respective load paths while concomitantly providing redundant paths for torque transmission. Should one gear assembly, i.e., load path, become inoperative, torque will be transmitted through the remaining gear assembly, thereby ensuring continued operation of the transmission system.

A schematic illustration of one embodiment of a split torque transmission system for helicopters is exemplarily illustrated in FIGS. 1, 2. Large helicopters typically utilize two or three gas turbine engines depending upon the gross weight, size, and power requirements of the helicopter, and FIGS. 1, 2 illustrate a split torque transmission system STTS for a three engine configuration. The split torque transmission system STTS transmits the power developed by the three helicopter engines to the rotor blade assembly which provides the motive power for the helicopter. The split torque transmission system STTS utilizes reduction gearing to convert engine RPM to torque for rotation of the helicopter main rotor blades.

The split torque transmission system STTS illustrated utilizes three stages of reduction gearing to reduce the RPM output of each engine (e.g., about 15,000 RPM) to an appropriate input level for the main rotor shaft (e.g., about 130 RPM). Each engine (not shown) provides an output to the transmission input via a shaft IS (which is normally coupled through a spring running clutch which has not been shown for purposes of simplification) to a gear train assembly GTA which provides torque transmission and splitting as described in the following paragraphs. A central bull gear CBG combines the split power transmitted by the gear train assembly GTA of each engine for rotation of a main rotor shaft MRS.

The first reduction stage of each gear train assembly GTA exemplarily illustrated in FIG. 1 is a bevel gear set (bevel pinion BP, bevel gear BG combination) that provides a reduction ratio of about 3.04/1 (from about 15,000 RPM to about 4934 RPM). The shaft angle of the bevel gear BG is positioned so that the centerline is parallel to the centerline of the main rotor shaft MRS. The second reduction stage is a simple spur gear set or a high contact ratio gear set (spur pinion SP, spur gear SG combination) that provides a reduction ratio of about 3.89/1 (from about 4934 RPM to about 1270 RPM). The final reduction stage is a double helical output gear set (double helical bull pinion DHP, central bull gear CBG combination) that provides a reduction ratio of about 9.77/1 (from about 1270 RPM to about 130 RPM).

Torque splitting is effected in the second stage of the gear train assembly GTA. Torque from each engine drive gear, i.e., the spur pinion SP, is split between the two second stage spur gears SG of each gear train assembly GTA. Each spur gear SG drives the corresponding integral, coaxial double helical bull pinion DHP. The central bull gear CBG combines the power from the two double helical bull pinions DHP of each gear train assembly GTA for rotation of the main rotor shaft MRS.

An inherent problem is designing such split power transmission system configurations is ensuring that torque is evenly split between the load paths, i.e., the respective spur gears SG and double helical bull pinions DHP. Any deviation in machining tolerances of the components of the gear train assemblies comprising the load paths may result in a 100% split, i.e., one load path will transmit the entire torque while the other load path will essentially free-wheel. This results in excessive wear and stress on the gear mechanisms in the load path transmitting 100% of the torque.

The above-described torque splitting configuration is one wherein load sharing is a function of the flexibility of the torsional path between the central bull gear CBG, the double helical bull pinions DHP, the second stage spur gears SG, and the second stage spur pinion SP. The configuration is a closed loop path that is extremely sensitive to the length of arc mesh. Any manufacturing errors and/or tolerance errors in the gears and/or pinions will lead to an unequal distribution of torque between the load paths.

The magnitude of these errors is proportional to the difference in length of the mesh path between the upper and lower load paths, i.e., the spur pinion SP, spur gears SG combination, and the double helical bull pinions DHP, central bull gear CBG combination, respectively, times the torsional spring rates of the paths. The greatest contributor to torsional spring rate is tooth mesh since the remaining torsional path is relatively stiff. To eliminate torque loading differences between the load paths, a torque adjusting device is typically interposed between the engine output gear, i.e., the spur pinion SP, and the central bull gear CBG to balance torque loads between the torque paths.

One prior art torque sharing device for split torque transmission systems is a quill shaft QS as exemplarily illustrated in FIG. 3. For the exemplary gear train assembly GTA illustrated in FIGS. 1, 2, the quill shaft QS is interposed between the spur gear SG and the shaft incorporating the double helical bull pinion DHP in each load path. Each spur gear SG is disposed in combination with a driven shaft DS while the corresponding double helical bull pinion DHP is integrally formed as part of a pinion shaft PS. The driven shaft DS is supported by a pair of bearings $B_{DS}$ and the pinion shaft PS is supported by a pair of bearings $B_{PS}$.

The quill shaft QS has a helically splined end HS and a straight splined end SS which mate with splined interior portions of the pinion shaft PS and the driven shaft DS, respectively. A shim Sh permits adjustment of the gear tooth alignment between the driven shaft DS and the pinion shaft PS by means of the splined ends of the quill shaft QS. By appropriate adjustment of the quill shaft QS by means of the shim Sh, balanced torque splitting between the load paths is achieved. The quill shaft QS provides a relatively soft torsional spring rate.

While the use of quill shafts QS is effective in compensating for manufacturing variations, and thus ensuring approximately a 50-50 torque split between respective gear train assemblies, incorporation of a quill shaft QS in each gear train assembly GTA increases the overall complexity and weight of the transmission system. This, in turn, increases the costs and time required for initial transmission system assembly and subsequent maintenance. In addition, the overall reliability of the transmission system is reduced such that periodic maintenance is required on a more frequent basis.

A need exists for a load sharing device that is operative to provide substantially equal torque distribution between the load paths of a split power transmission system. Such a device should be relatively simple in construction, thereby reducing the weight and complexity of the transmission system, while enhancing the overall reliability of the transmission system.

DISCLOSURE OF THE INVENTION

One object of the present invention is to provide a simplified load sharing device that provides substantially equal torque distribution between the load paths of a split power transmission system.

Another object of the present invention is to provide a load sharing device that reduces the weight and complexity of a split power transmission system.

Yet another object of the present invention is to provide a load sharing device that enhances the overall reliability of a split power transmission system.

These and other objects were achieved in commonly-owned, co-pending patent application Ser. No. 07/525,388, filed May 16, 1990, entitled "Elastomeric Torsional Isolator", which is incorporated by reference herein. In contrast to the "split torque" transmission system described hereinabove, where torque distribution depends upon the manufactured configurations and interactions of the gear elements of the gear train assemblies, the 388 application describes and claims a "split path" transmission system wherein a "soft torsional spring" device, i.e., the elastomeric torsional isolator, provides load sharing in proportion to manufacturing errors and spring rates of the device.

The elastomeric torsional isolator of the '388 application is operative to frictionally transmit torque between the spur gear and the shaft incorporating the bull pinion, in contrast to a split torque transmission system incorporating quill shafts wherein torque is transmitted due to the physical engagement between the splined ends of the quill shaft and the splined portions of the driven and pinion shafts. Due to the axial and radial spring rates of the elastomeric torsional isolator, the elastomeric torsional isolator described and claimed in the '388 application can accommodate variations in mechanical tolerances of the gear train assembly to provide balanced torque distribution in the split path transmission system.

Referring to FIG. 4, each double helical bull pinion DHP of the '388 gear train assembly is integrally formed as part of a central shaft CS supported by roller bearings $B_{CS}$. A circular flange gear CFG is integrally provided on the upper end of the central shaft CS, and includes a plurality of teeth FT on the outer circumference and means SM for securing upper and lower rims UR, LR to the circular flange gear CFG. The upper and lower rims UR, LR are operative, in combination with an elastomeric torsional isolator ETI according to the present invention, to transmit torque from a spur gear SG to the circular flange gear CFG. The spur gear SG is an annular gear having outer gear teeth OGT engaged and driven by the spur pinion (not shown) and inner spline teeth (not shown) which are aligned but not normally engaged with, the teeth FT of the circular flange gear CFG.

The elastomeric torsional isolator ETI is secured to the angled circumferential walls of the upper and lower rims UR, LR by conventional methods such as vulcanizing or adhesives. The elastomeric torsional isolator ETI comprises one or more layers, each layer including an elastomer having a metal backing strip secured thereto by conventional means such as vulcanizing, bonding or lamination. The elastomer is formed from an elastomeric material such as nitrile rubber, fluorocarbon rubber, fluoroelastomer rubber, fluorosilicon rubber, or combinations thereof which has excellent high temperature properties and resistance to gearbox and hydraulic oils. The metal backing strip may be formed from metals or alloys such as steel, stainless steel, or titanium.

The securing means SM is operative to secure the upper and lower rims UR, LR to the circular flange gear CFG, and concomitantly to compressively preload the elastomeric torsional isolator ETI in torque-transmitting combination with complementary surfaces of the spur gear SG. Adjusting shims ASh may be disposed in combination with the securing means SM to provide a means for adjusting the compressive preload of the elastomeric torsional isolator ETI. Compressive preloading of the elastomeric torsional isolator ETI provides a high normal force between the upper and lower rims UR, LR and the spur gear SG for frictionally transmitting torque across the elastomeric torsional isolator ETI from the spur gear SG to the annular flange gear AFG.

To provide the above-described torque transmitting characteristics, the axial and radial spring rates of the elastomeric torsional isolator ETI are preferably stiff while the torsional spring rate is preferably soft. For example, for a helicopter split path transmission system, $K_{axial}$ may be about 1,490,000 lbs./in., $K_{radial}$ may be about 2,750,000 inch lbs./radian. $K_{torsional}$ may be about 570,000 inch lbs./radian. Such an elastomeric torsional isolator ETI permits about 0.070 to about 0.080 inches of torsional deflection at the radius of the gear teeth FT.

As described above, the gear teeth FT of the circular flange gear CFG and the inner spline teeth of the spur gear SG are not meshed during normal operation of the split path transmission system due to the configuration, compressive preloading, and radial spring rate of the elastomeric torsional isolator ETI. However, should an engine overtorque occur, or should the elastomeric torsional isolator ETI fail, the inner spline teeth of the spur gear SG will engage the gear teeth FT of the circular flange gear CFG so that the '388 gear train assembly continues to provide power to the main rotor bull gear (not shown).

The split path transmission system of the '388 application, utilizing elastomeric torsional isolators, is a significant improvement over prior art split torque transmission systems. The elastomeric torsional isolator accommodates variations in mechanical tolerances of the gear elements to provide balanced torque distribution between the load paths. The elastomeric torsional isolator reduces the complexity and weight of the transmission system by reducing the number of support bearings required (two versus four for each load path—twelve less support bearings overall), reducing the overall length of the transmission system, and by utilizing a single gear shaft assembly in lieu of a three gear shaft assemblies (quill shaft embodiment). In light of the reduced complexity of the split path transmission system incorporating the above-described elastomeric torsional isolator, the split path transmission system has enhanced reliability as compared to a split torque transmission system.

While the split path transmission system utilizing the elastomeric torsional isolator does provide a significant improvement over prior art split torque transmission systems, there is some concern regarding the effects of the torque transmission mechanics on the integrity of the elastomeric torsional isolator. The elastomeric torsional isolator transmits torque between the spur gear and the circular flange gear essentially through a shear mechanism. The concern is that a shear-driven elastomeric torsional isolator may be prone to long term deterioration and possible failure under prolonged shear loading.

The elastomeric load sharing device of the present invention possesses all of the advantages of the elastomeric torsional isolator described in the preceding paragraphs. The elastomeric load sharing device of the present invention, however, utilizes a compressive mechanism, rather than a shear mechanism, to provide balanced torque distribution between the complementary load paths of a split path transmission system.

The elastomeric load sharing device is interposed in each torque-splitting gear train assembly between a driven gear element and a central drive shaft and is operative to compensate for tolerance deviations in the mechanical elements of the gear train assembly, thereby providing balanced torque distribution. For the embodiment described herein, the elastomeric load sharing device is interposed between the driven spur gear ring and the central torque drive shaft of each torque-splitting gear assembly.

The driven spur gear ring includes a plurality of outer teeth configured to receive torque from an engine drive gear and a plurality of inwardly extending drive tangs configured to transmit torque from the driven spur gear ring to the central torque drive shaft. The central torque drive shaft includes an integrally formed bull pinion at one end thereof and an integral flange extension at the other end thereof that includes a plurality of outwardly extending driven tangs complementary to the spur gear drive tangs.

The elastomeric load sharing device of the present invention comprises an annular cylindrical elastomeric bearing and a plurality of elastomeric bearing pads. Each elastomeric bearing and bearing pad includes one or more layers, each layer comprising an elastomer having a metal backing strip secured thereto. The elastomer is an elastomeric material having excellent high temperature properties and resistance to gearbox and hydraulic oils. The metal backing strip is a structurally rigid metal or alloy.

The cylindrical elastomeric bearing is interposed between cylindrical segments of the driven spur gear and the central torque drive shaft, and is configured to have a high radial stiffness and a low torsional stiffness. The elastomeric bearing is operative to radially center the driven spur gear and to minimize torque transfer between the driven spur gear and the central torque drive shaft.

The elastomeric bearing pads are configured for interposition between respective driving and driven tangs and to have a low radial and torsional stiffness and a high axial stiffness. The bearing pads are operative to compressively transmit torque from the driving tangs to corresponding driven tangs. While possessing low torsional stiffness in itself, the bearing pads are sufficiently compliant to accommodate circumferential displacement to facilitate balanced torque distribution because of the small angular tilt of the bearing pads with respect to the radial line.

The torsional spring rate may be adjusted by changing the tilt angle which then makes use of the vector components of the soft torsional spring rate and the high axial spring rate. The angular tilt of the bearing pads with respect the a radial line is generally between about 10 degrees and about 20 degrees.

The foregoing and other features and advantages of the present invention will become more apparent from the following description and accompanying drawings.

BEST MODE FOR CARRYING OUT THE INVENTION

Figure 1:
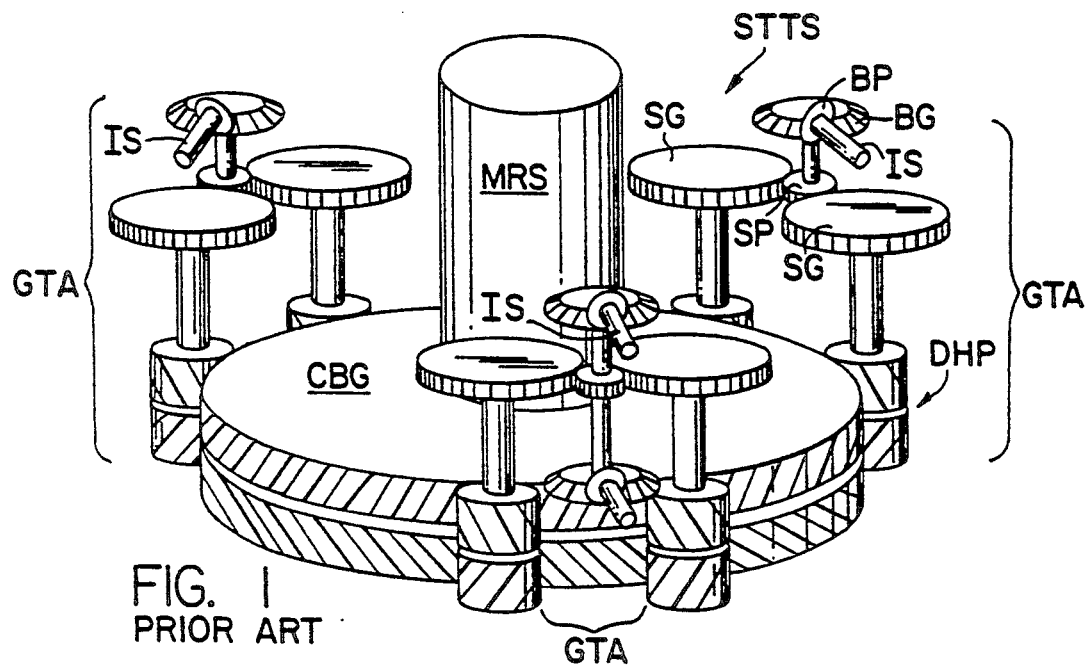
FIG. 1 is a perspective view of an exemplary embodiment of a prior art split power transmission system for a three engine configuration.
Figure 2:
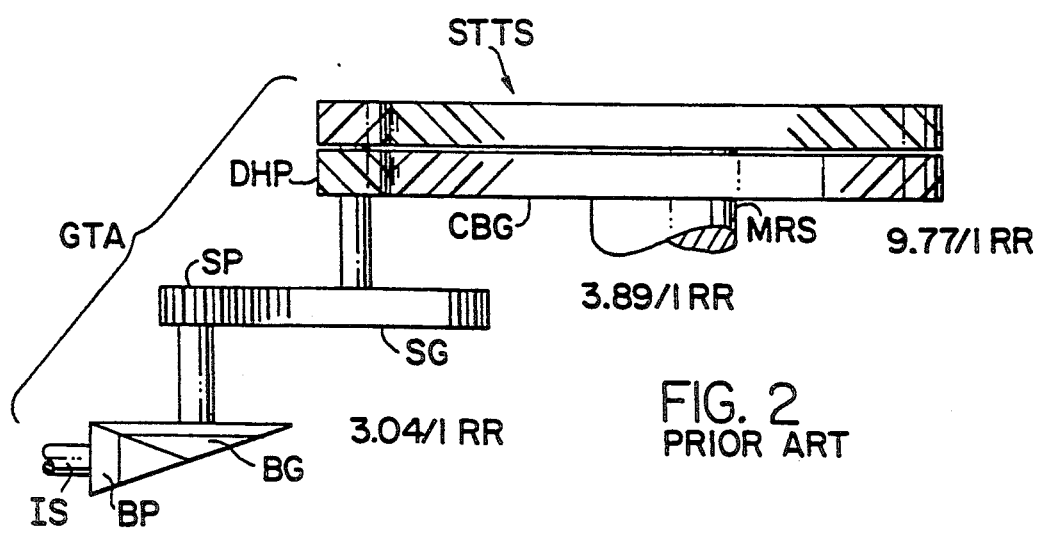
FIG. 2 is a partial plan view of the embodiment of FIG. 1.
Figure 4:
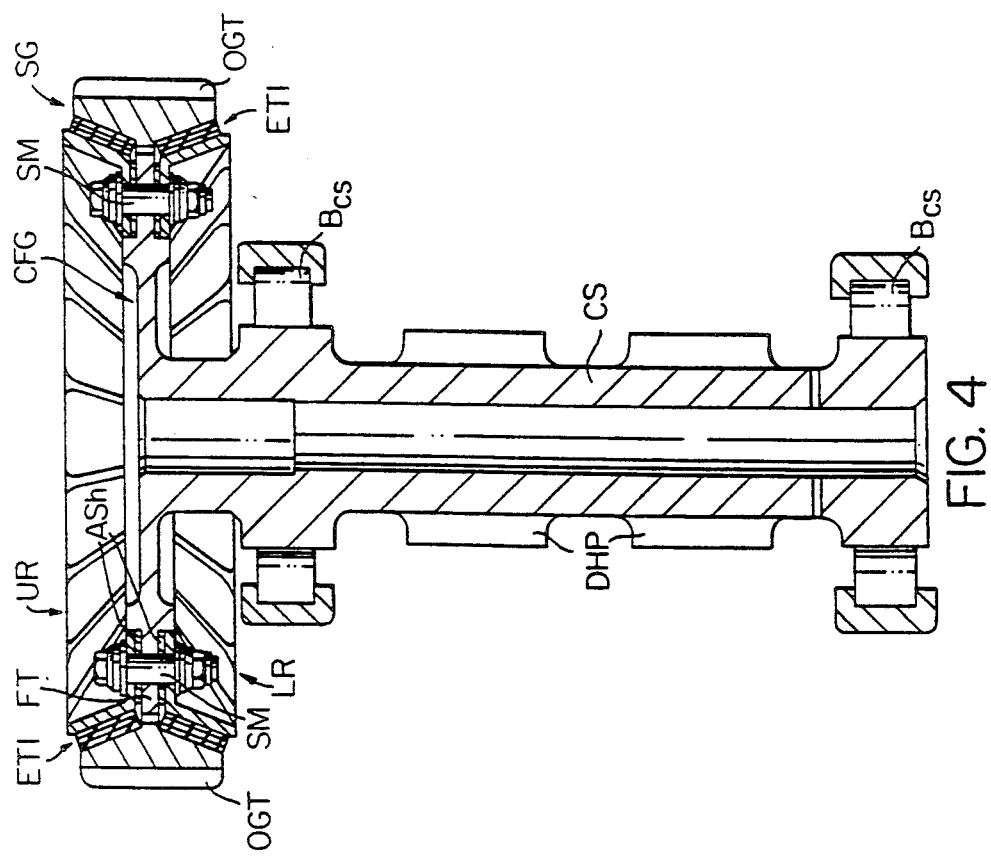
FIG. 4 is a partial cross-sectional view illustrating an elastomeric torsional isolator for a split path transmission system.
Figure 3:
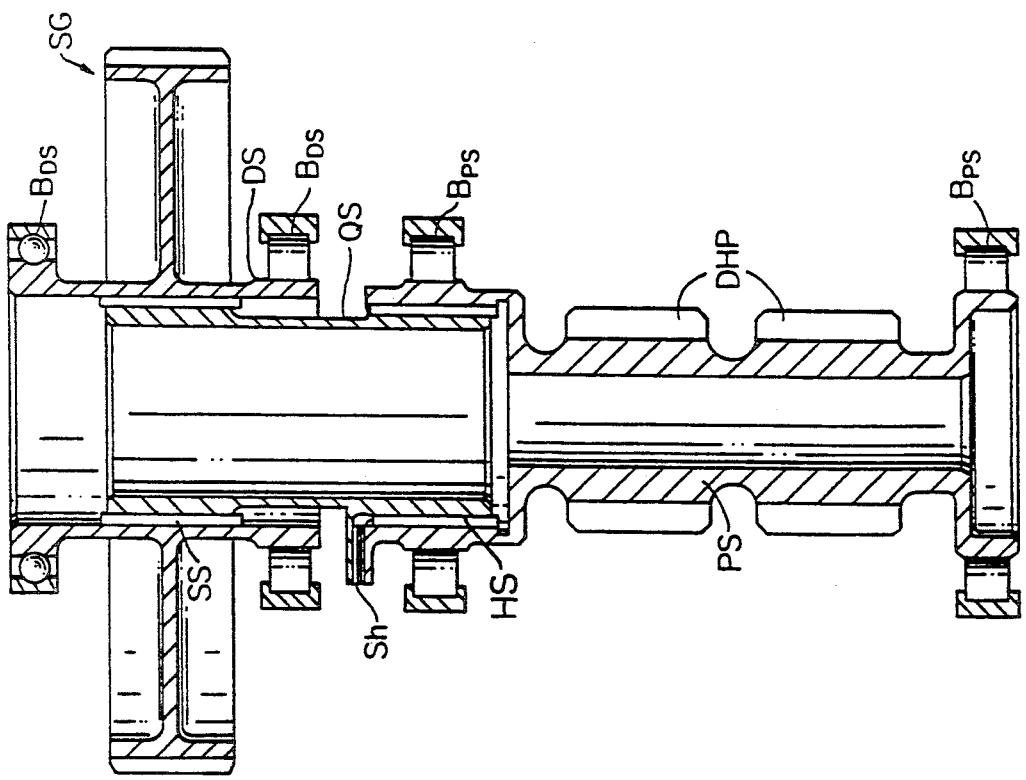
FIG. 3 a partial cross-sectional view illustrating a prior art quill shaft torque adjusting device for a split torque transmission system.
Figure 5:
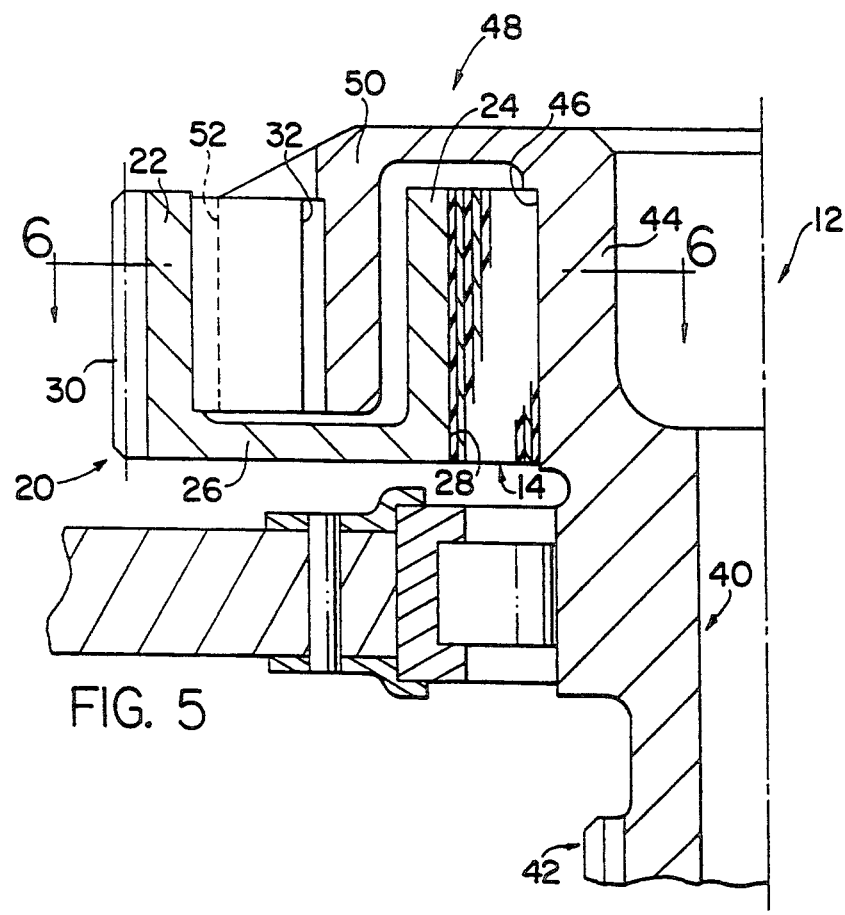
FIG. 5 is a partial cross-sectional view illustrating an elastomeric load sharing device according to the present invention for a split path transmission system.
Figure 6:
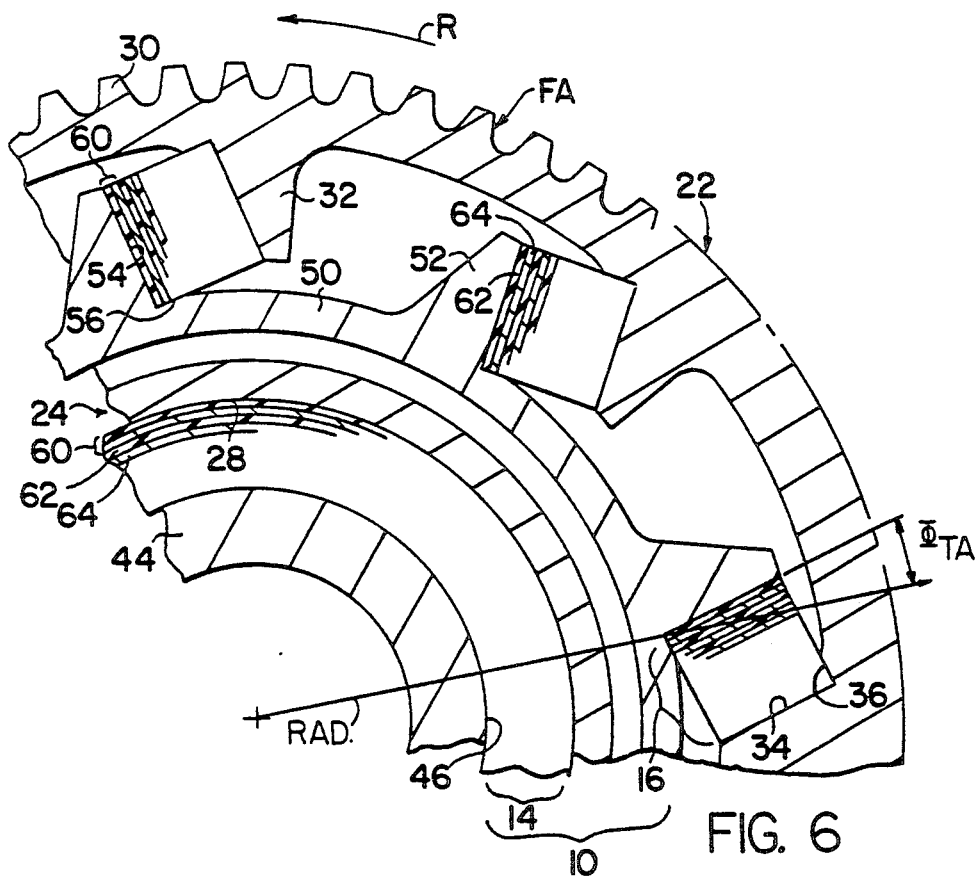
FIG. 6 is a cross-sectional view taken along line 6—6 of FIG. 5.

Referring now to the drawings wherein like reference numerals designate corresponding or similar elements throughout the several views, FIGS. 5 and 6 illustrate an elastomeric load sharing device 10 according to the present invention for a split path transmission system. The elastomeric load sharing device 10 possesses all of the advantages described hereinabove with respect to the elastomeric torsional isolator of the '388 patent application. The mechanics of torque transmission of the elastomeric load sharing device 10 of the present invention, however, is essentially a compression mechanism, and thus, the elastomeric load sharing device 10 of the present invention is not subject to the same type of shear mechanism as the elastomeric torsional isolator of the '388 patent application.

Like the elastomeric torsional isolator of the '388 patent application, the elastomeric load sharing device 10 of the present invention is disposed in each torque-splitting gear train assembly to facilitate balanced torque distribution between respective driven spur gear and bull pinion pairs. FIG. 5 is a partial cross-sectional view of the relevant portion of a gear train assembly 12 illustrating the exemplary structural configurations and interrelationships of a driven spur gear 20, a central torque drive shaft 40, and the elastomeric load sharing device 10 of the present invention.

The driven spur gear 20 comprises an outer spur gear ring 22, an inner cylindrical ring 24, and a spur gear extension member 26 integrally connecting the outer spur gear ring 22 and the inner cylindrical ring 24. The inner cylindrical ring 24 includes an outer bearing surface 28.

The outer spur gear ring 22 includes a plurality of teeth 30 extending radially outwardly therefrom and a plurality of driving tangs 32 extending radially inwardly therefrom, as more clearly illustrated in FIG. 6. The teeth 30 are configured to interact with corresponding teeth of a drive member of the gear train assembly 12 such as a spur pinion (not shown) that transmits torque to the driven spur gear 20. Each driving tang 32 is configured to facilitate torque transmission and includes a bearing pad engaging surface 34 and a bearing pad alignment surface 36.

The central torque drive shaft 40 includes an integrally formed bull pinion 42 adjacent one end thereof. The bull pinion 42 is configured to transmit torque to a central bull gear (not shown) for rotating the main rotor blades of a helicopter. For the embodiment illustrated, the bull pinion 42 is a double helical pinion having high helix angles (up to 31°) and high contact ratios (exceeding 4). The double helical pinion 42 is operative to balance axial thrust forces such that the net axial force exerted by the central torque drive shaft 40 is approximately zero.

The other end 44 of the central torque drive shaft 40 is configured as a cylindrical ring having an outer diameter slightly greater than the outer diameter of the central torque drive shaft 40 and includes an outer bearing surface 46 complementary to the inner bearing surface 28 of the driven spur gear 20. The cylindrical ring 44 has an integral flange extension 48 extending radially outwardly therefrom that includes an outer cylindrical ring 50. Extending radially outward from the outer cylindrical ring 50 are a plurality of driven tangs 52, equal in number to the plurality of tangs 32 of the outer spur gear ring 22, which are configured to facilitate torque transmission. Each driven tang 52 includes a bearing pad mounting surface 54 that is substantially parallel to the bearing pad engaging surfaces 34 and a bearing pad seating surface 56 that is substantially parallel to the bearing pad alignment surfaces 36.

As illustrated in FIG. 6, each bearing pad mounting surface 54 is orientated at a predetermined angular tilt $\Phi_{TA}$ with respect to a corresponding radial line Rad. The angular tilt $\Phi_{TA}$ of the bearing pad mounting surfaces 54 is preferably in the range of about 10 degrees to about 20 degrees.

The elastomeric load sharing device 10 of the present invention exemplarily illustrated in FIGS. 5 and 6 comprises an annular cylindrical elastomeric bearing 14 and a plurality of rectangular elastomeric bearing pads 16. The elastomeric bearing 14 and each of the bearing pads 16 comprises one or more layers 60, each layer 60 including an elastomer 62 having a metal backing strip 64 secured thereto by conventional means such as vulcanizing, bonding or lamination. The elastomeric bearing 14 may have the same number of layers 60 as the elastomeric bearing pads 16 or a different number of layers 60.

The elastomer 62 is formed from an elastomeric material such as nitrile rubber, fluorocarbon rubber, fluoroelastomer rubber, fluorosilicon rubber, or combinations thereof that has excellent high temperature properties and resistance to gearbox and hydraulic oils. For example, polyvinylidene fluoride cohexafluoropropylene may be used as the elastomeric material. The metal backing strip 64 may be formed from metals or alloys such as steel, stainless steel, or titanium.

The cylindrical elastomeric bearing 14 is interposed between the inner cylindrical ring 24 of the driven spur gear 20 and the cylindrical ring 44 of the central torque drive shaft 40 so that the inner and outer surfaces of the elastomeric bearing 14 abuttingly engage the outer bearing surface 46 and the outer bearing surface 28, respectively. For example, the elastomeric bearing 14 may be press fitted onto the central torque drive shaft 40 so that the inner surface of the elastomeric bearing 14 engages the outer bearing surface 46. The driven spur gear 20 may be press fitted onto the elastomeric bearing 14 utilizing an alignment tool (not shown) so that the outer bearing surface 28 engages the outer surface of the elastomeric bearing 14. The alignment tool provides angular orientation between the intersection point of pitch lines on driving side of index tooth of the helical bull pinion 42 and index tooth pitch line of driven spur gear 20. The cylindrical elastomeric bearing 14 is configured to have a high radial stiffness and a low circumferential or torsional stiffness. For example, a cylindrical elastomeric bearing 14 comprising ten layers 60 and having a length of about 2 inches and a thickness of about 0.5 inches has the following spring rates: a $K_{radial}$ of about 5,700,000 lbs./in. and a $K_{torsional}$ of about 58,800 in.lb./radian.

The cylindrical elastomeric bearing 14 is operative to radially center the outer spur gear ring 22 and to provide torsional compliance between the driven spur gear 20 and the central torque drive shaft 40. The torsional compliance, i.e., low torsional stiffness, of the elastomeric bearing 14 minimizes torque transfer between the driven spur gear 20 and the central torque drive shaft 40.

The bearings pads 16 are interposed in combination between respective driving tangs 32 and driven tangs 52. With the driven spur gear 20, the central torque drive shaft 40, and the cylindrical elastomeric bearing 14 assembled in combination as described hereinabove, each bearing pad 16 is configured (for example by being ground to proper dimensions) to abuttingly engage the bearing pad engaging and alignment surfaces 34, 36 of the corresponding driving tang 32 and the bearing pad mounting and seating surfaces 54, 56 of the corresponding driven tang 52. Any of several means may be utilized for retaining the bearing pads 16 interposed in combination between respective driving tangs 32 and driven tangs 52.

For example, the bearing pads 16 may be bonded (using adhesives or other means) to the bearing pad engaging and alignment surfaces 34, 36 of the corresponding driving tang 32. Alternatively, the bearing pads 16 may be bonded to the bearing pad engaging and alignment surfaces 34, 36 and the bearing pad mounting and seating surfaces 54, 56 of the corresponding driving and driven tangs 32, 52. Or, the bearing pads 16 may be press fitted into position between corresponding driving and driven tangs 32, 52, and then the entire assembly may be potted in a soft matrix material. The matrix material should have characteristics wherein the bearing pads 16 are held in the proper position between the respective driving tangs 32 and driven tangs 52 while concomitantly permitting rotation without restraint. Alternatively, the entire assembly may be made by vulcanizing in a tool.

Each bearing pad 16 has a low radial and torsional stiffness and a high axial stiffness. For example, for an embodiment of the elastomeric load sharing device 10 having eight bearing pads 16 (each bearing pad 16 having ten layers 60), each bearing pad 16 has the following spring rates: a $K_{torsional}$ of about 542,000 in.lbs./radian and each layer 60 of the individual bearing pads 16 has a $K_{axial}$ of about 1,090,000 lbs./in. and a $K_{radial}$ of about 7,200 lbs./in. The bearing pads 16 are operative to transmit torque from the driven spur gear 20, via the driving tangs 32, to the driven tangs 52 of the central torque drive shaft 40. With reference to FIG. 6, the driven spur gear 20 is caused to rotate in the direction R due to an applied force $F_A$ (resultant tooth loading) exerted by a drive member such as a spur pinion (not shown) against the teeth 30 of the outer spur gear ring 22. Force is transmitted principally via respective bearing pad engaging surfaces 34 of the driving tangs 32 to corresponding bearing pads 16. Each bearing pad 16 is driven essentially in compression by the force exerted by the corresponding driving tang 32, i.e., the bearing pad 16 is compressed towards the bearing pad mounting surface 54 of the corresponding driven tang 52. Furthermore, while the bearing pads 16 have a low torsional stiffness, the bearing pads 16 are sufficiently compliant to accommodate displacements of up to about 1/16 inch in the circumferential direction to facilitate balanced torque distribution.

The cylindrical elastomeric bearing 14 and the bearing pads 16 comprising the elastomeric load sharing device 10 of the present invention are equivalent to springs in parallel. The spring rates of individual springs in parallel may be added to ascertain the overall spring characteristics of the system. The spring rates of the elastomeric bearing 14 and the bearing pads 16 may be adjusted, as necessary, by altering the configurations thereof to provide the overall requisite spring rate for the elastomeric load sharing device 10 of the present invention. Furthermore, the torsional spring rate of the bearing pads 16 may be adjusted by changing the angular tilt $\Phi_{TA}$ of the bearing pad mounting surfaces 54 of the driven tangs 52. The spring rate of the bearing pads 16 then makes use of the vector components of the soft torsional spring rate and the high axial spring rate.

The configuration of the elastomeric load sharing device 10 of the present invention also provides the split path transmission system with a fail-safe capability. Should the bearing pads 16 fail or become dislodged, the bearing pad engaging surfaces 34 of the driving tangs 32 will contact the bearing pad mounting surfaces 54 of the driven tangs 52 such that torque will continue to be transmitted to the central torque drive shaft 40.

While the foregoing disclosure has been generally described in terms of split path transmission systems for helicopters, it will be appreciated that the foregoing disclosure may be applicable to drive train systems in general having split load paths.

Although the present invention has been shown and described with respect to certain detailed embodiments thereof, it will be understood by those skilled in the art that various changes in form and detail thereof may be made without departing from the spirit and scope of the claimed invention.

What is claimed is:

1. In a split power transmission system having torque-splitting gear train assemblies defining load paths for transmitting torque from an engine to an output member, each torque-splitting gear train assembly comprising:

driven gear means for receiving torque from the engine, said driven gear means being further operative for transmitting torque;

central torque drive shaft means disposed in combination with said driven gear means and operative in response to torque transmitted by said driven gear means for transmitting torque from said driven gear means to the output member; and elastomeric load sharing means interposed in combination with said driven gear means and said central torque drive shaft means for providing balanced torque distribution between respective load paths of each torque-splitting gear train assembly, said elastomeric load sharing means including first elastomeric bearing means interposed in first combination between said driven gear means and said central torque drive shaft means for radially centering said driven gear means, and second elastomeric bearing means interposed in second combination between said driven gear means and said central torque drive shaft means for compressively transmitting torque from said driven gear means to said central torque drive shaft means.

2. The torque-splitting gear train assembly of claim 1 wherein said first elastomeric bearing means comprises an annular cylindrical elastomeric bearing having a high radial stiffness and a low torsional stiffness, said low torsional stiffness of said annular cylindrical elastomeric bearing providing torsional compliance between said driven gear means and said central torque drive shaft means for minimizing torque transfer therebetween.

3. The torque-splitting gear train assembly of claim 2 wherein said annular cylindrical elastomeric bearing comprises at least one layer, said at least one layer including an elastomeric material having excellent high temperature properties and resistance to gearbox and hydraulic oils, and a metal backing strip secured to said elastomeric material.

4. The torque-splitting gear train assembly of claim 2 wherein said driven gear means includes an inner cylindrical ring having an outer bearing surface, said central torque drive shaft means includes a cylindrical ring having an outer bearing surface, and said annular cylindrical elastomeric bearing has inner and outer surfaces, and further wherein said annular cylindrical elastomeric bearing is interposed in said first combination with said inner surface of said annular cylindrical elastomeric bearing engaging said outer bearing surface of said cylindrical ring of said central torque drive shaft means and said outer surface of said annular cylindrical elastomeric bearing engaging said outer surface of said inner cylindrical ring of said driven gear means.

5. The torque-splitting gear train assembly of claim 1 wherein said second elastomeric bearing means comprises a plurality of elastomeric bearing pads having a low radial and torsional stiffness and a high axial stiffness, said plurality of elastomeric bearing pads being sufficiently compliant to accommodate a predetermined circumferential displacement to facilitate balanced torque distribution.

6. The torque-splitting gear train assembly of claim 5 wherein each of said plurality of elastomeric bearing pads comprises at least one layer, said at least one layer including
- an elastomeric material having excellent high temperature properties and resistance to gearbox and hydraulic oils, and
- a metal backing strip secured to said elastomeric material.

7. The torque-splitting gear train assembly of claim 5 wherein said driven gear means includes an outer spur gear ring having a plurality of driving tangs extending radially inwardly therefrom and said central torque drive shaft means includes an outer cylindrical ring having a plurality of driven tangs equal in number to said plurality of driving tangs, and further wherein each of said plurality of elastomeric bearing pads is interposed in combination between respective driving and driven tangs.

8. The torque-splitting gear train assembly of claim 7 wherein each of said plurality of driving tangs includes a bearing pad engaging surface and each of said plurality of driven tangs includes a bearing pad mounting surface that is substantially parallel to said bearing pad engaging surface of said corresponding driven tang, and further wherein said torque compressively transmitted from said driven gear means to said central torque drive shaft means approximately perpendicularly to said bearing pad engaging and mounting surfaces.

* * * * *